United States Patent
Sun

(10) Patent No.: US 7,130,187 B1
(45) Date of Patent: Oct. 31, 2006

(54) DEVICE OF HARD DISK SHOCK-RESISTANCE

(75) Inventor: Chien-Ping Sun, Taipei (TW)

(73) Assignee: ET&T Technology Co., Ltd., Taipei (TW)

( * ) Notice: Subject to any disclaimer, the term of this patent is extended or adjusted under 35 U.S.C. 154(b) by 0 days.

(21) Appl. No.: 11/115,177

(22) Filed: Apr. 27, 2005

(51) Int. Cl.
*G06F 1/16* (2006.01)

(52) U.S. Cl. .................... 361/685; 248/560; 360/97.01; 206/320

(58) Field of Classification Search ............. 123/192.1; 386/70; 293/132, 146; 248/560, 592; 206/320; 360/73.02, 97.01; 361/679–687, 724–727; 369/219
See application file for complete search history.

(56) References Cited

U.S. PATENT DOCUMENTS

| 5,535,092 A | * | 7/1996 | Bang | ......................... 361/685 |
| 6,961,238 B1 | * | 11/2005 | Aketagawa et al. | ........ 361/685 |
| 2004/0070867 A1 | * | 4/2004 | Kudo et al. | .............. 360/97.01 |

* cited by examiner

*Primary Examiner*—Hung Van Duong
(74) *Attorney, Agent, or Firm*—Birch, Stewart, Kolasch & Birch, LLP

(57) ABSTRACT

This invention is directed as "a device of hard disk shock-resistance", mainly consists of an outer frame, an inner frame, and multiple absorbers. With multiple assembly and tool holes arranged in appropriate position, the absorbers are snapped in-between the assembly holes of the outer and inner frames to create a buffer area which protects hard disk from breaking down in severe shocking environments, while it is still convenient to mount and dismount the hard disk with easy unit assembly.

6 Claims, 5 Drawing Sheets

DEVICE OF HARD DISK SHOCK-RESISTANCE

BACKGROUND OF THE INVENTION

I. Field of the Invention

The present invention provides a mechanism relating to "a device of hard disk shock-resistance", especially refers to a damping-buffer structure, which can absorb shocks from any directions toward the hard disk; its absorbers once installed are uneasy to loosen off, and the mounting and dismounting the disk on/from the present invention is convenient.

II. Description of the Prior Art

Owing to being one of the standard popular equipment of conventional notebook PC or other portable electronic appliance equipped with hard disk, the demand quantity of hard disk becomes very huge and makes the disk volume grow larger and production cost lower. This fact does not change one of the defective points of hard disk, that is, the reader tends to scratch the surface of disk platter by unexpected violent vibrating.

Thereafter, hard disk manufacturer worked in an effort to enhance the shock-resistance ability. Although the shock-resistance ability did improve steadily, the improved hard disk still could not meet the requirement of avoiding the unexpected violent vibrating in a moving vehicle. How to overcome the potential damage caused by the shock of car wheel rolling over the uneven pavement is an urgent measure. In order to meet the above-mentioned requirement, the present invention designed a shock-resistance device consisting of two frames connected with multiple absorbers to protect hard disk from damaging by effectively damping out the shocks from any directions, despite the convenience of assembling or disassembling the frames, the absorbers, and the hard disk into one unit or several parts.

SUMMARY OF THE INVENTION

It is therefore a primary main objective of the present invention to provide "a device of hard disk shock-resistance" which can absorb the shocking stress from any directions, without either loosening off the installed absorbers or influencing the convenient of hard disk installation.

In detail, the current invention primarily comprises an screw-fixed outer frame, a float-moving inner frame and multiple absorbers; and characterized by: the outer frame has multiple assembly holes paired up in a slope way for fixing absorbers around the frame bottom, and multiple tool holes on the sidewalls for tools to pass through; the inner frame also has multiple assembly holes paired up in a slope way around each corner of the bottom in opposite to each assembly hole of the outer frame, and multiple tool holes on each sidewall for tools to pass through. Each absorber has two nail heads at both ends, and a belly separated with two grooves between the two nail heads. The grooves are snapped into the assembly holes of the outer and inner frames with the belly and the space in-between forming a buffer area, that is, to take the advantages of the space between sidewalls of the outer and inner frames, with the belly of the absorbers as cushions, to build the buffer area for shock-absorbing.

Accordingly, when the hard disk installed into the center of the inner frame of the present invention, a screwdriver can pass through the tool holes of the outer and inner frames to screw a bolt on each stationary hole; which makes mounting and dismounting the hard disk very conveniently. With the pair-up set up holes in a slop way, assemble and disassemble of the absorbers between inner and outer frames become very quickly and easily in tight fitting space. The double frames design allows the outer frame to protect the absorbers from broken or loosen off under extreme horizontal shocking, and the bellies of the absorbers unload the shocks from both the horizontal and vertical vibration. Therefore the present invention has the ability to disperse shocks from any directions.

BRIEF DESCRIPTION OF THE DRAWINGS

The accomplishment of the above-mentioned objective of the present invention will become apparent from the following description and its accompanying drawings which disclose the illustrate and embodiment of the present invention as follows.

DETAILED DESCRIPTION OF THE PREFERRED EMBODIMENT

Figure 1:
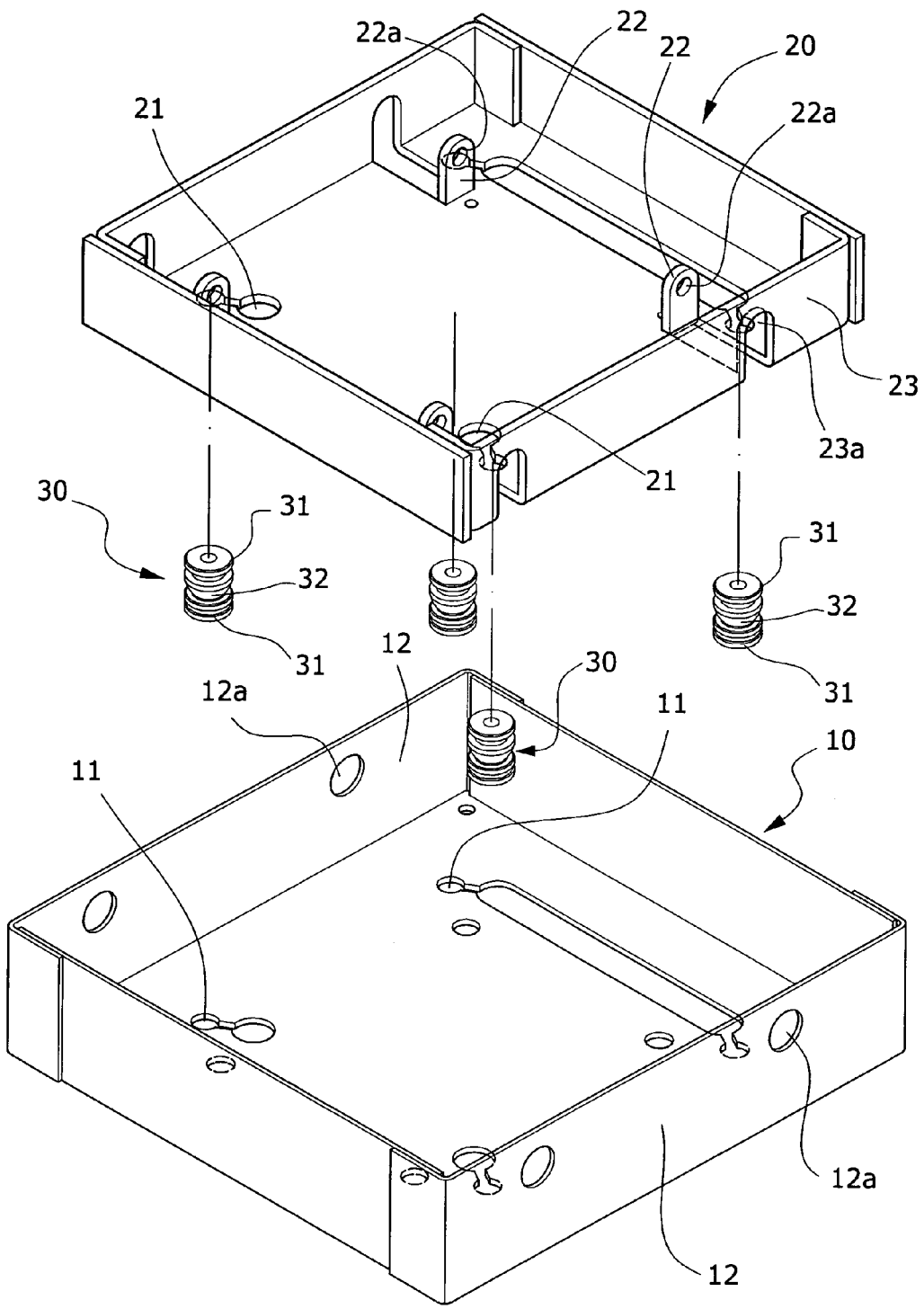
FIG. 1 is a perspective view of the present invention.
Figure 2:
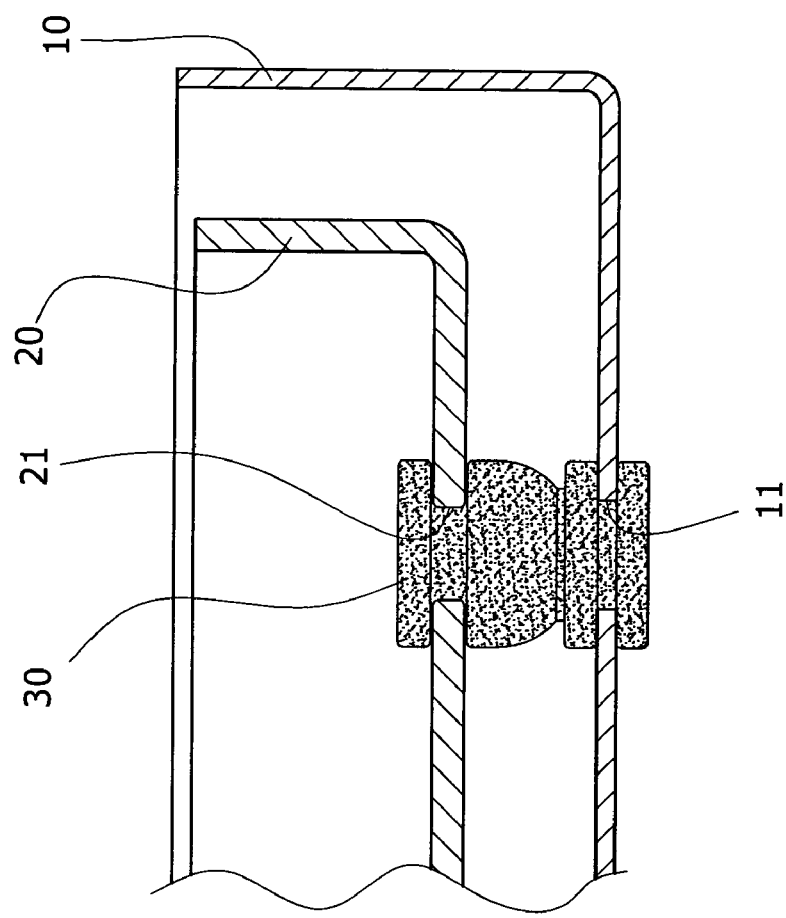
FIG. 2 is a perspective view of an assembled cardiogram.

First of all, referring to FIGS. 1, 2, the shock-resistance device in accordance with the present invention primarily comprises an outer frame 10 an inner frame 20 and multiple absorbers 30, and characterized by:

The outer frame 10 have multiple assembly holes 11 for fixing absorbers 30 around the frame bottom, the paired assembly holes 11 are set in a slope way, and multiple tool holes 12a on each side wall 12 allow tools to pass through.

The inner frame 20 also has multiple assembly hole 21, set up in a slope way, around each corner of the bottom, in opposite to each assembly hole 11 of the outer frame 10, and around each corner of the bottom surface of inner frame 20 there are stationary plate 22 bent upward with a stationary hole 22a opposite to the tool hole 23a; furthermore, the inner frame 20 will avoid or decrease the high frequency resonance if the frame is built with enough thickness and better quality of metal plate.

Each of the absorber 30 has two nail heads 31 at both end, and a belly 32 separated by two grooves fitting into the assembly holes 11 21 of the outer frame 10 and inner frame 20 in forming a buffer area; the set up can take the advantages of the space between sidewall 12 23 of the outer and inner frames, as well as the belly cushion, to be the buffer area for shocks-absorbing.

Figure 3:
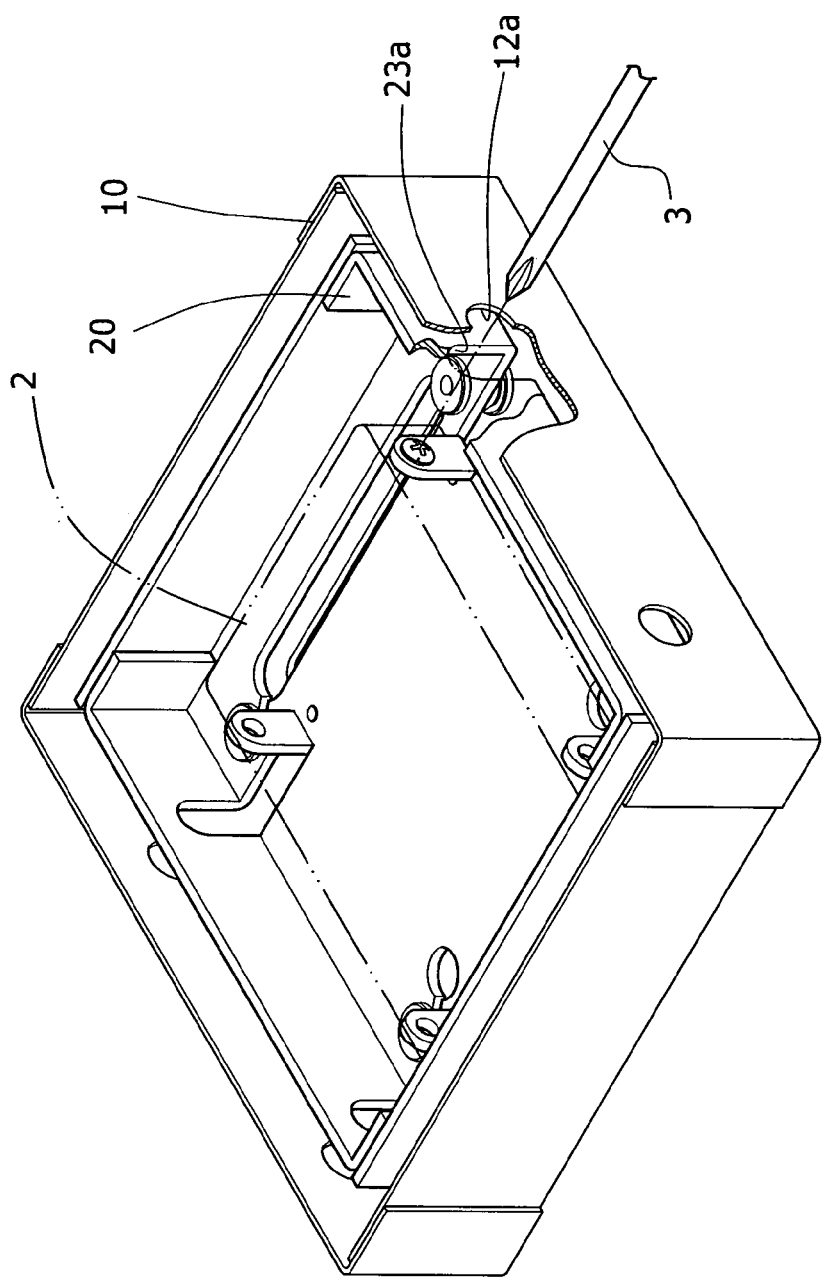
FIG. 3 is a perspective view of the hard disk installation.
Figure 4:
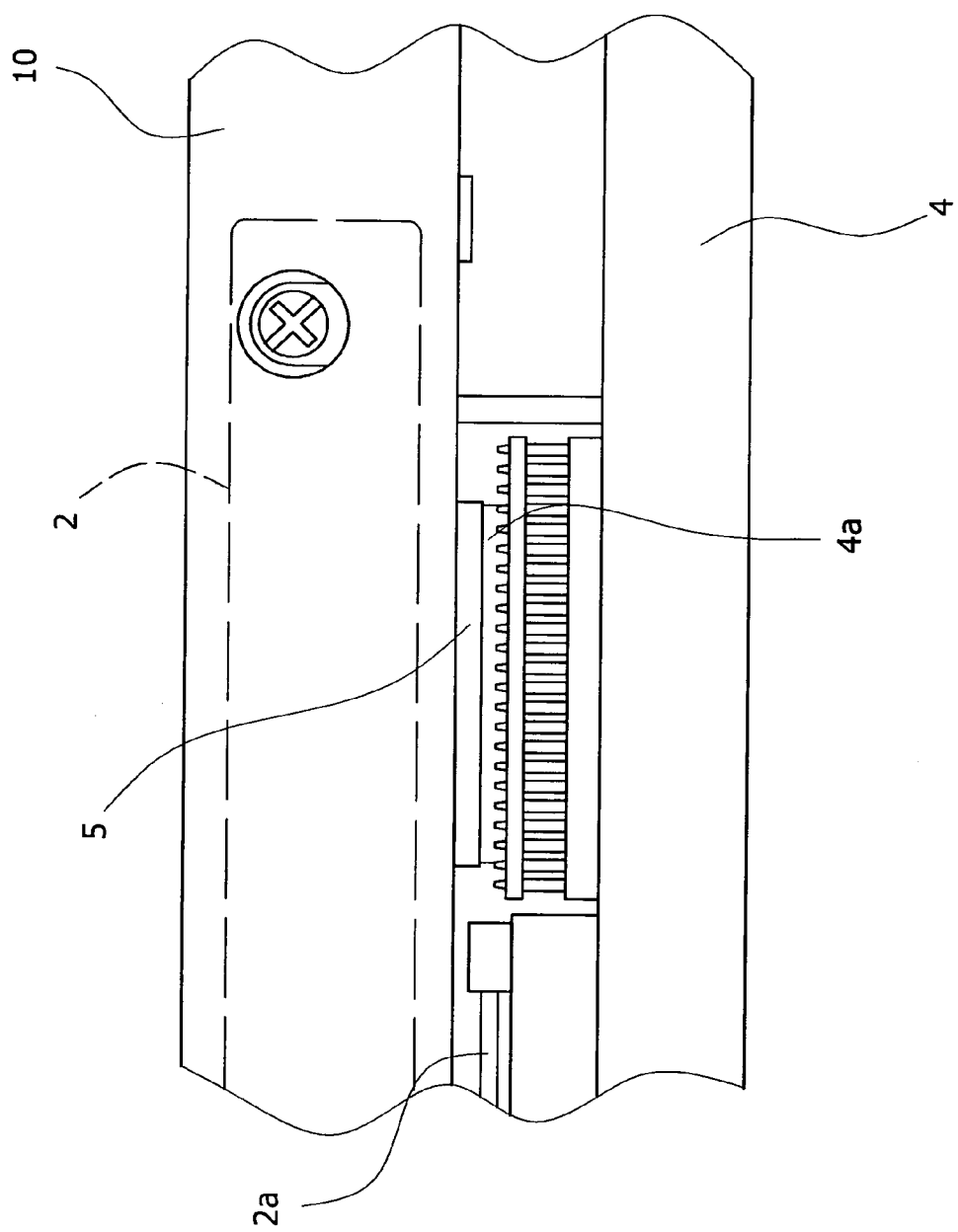
FIG. 4 is the side view the present invention assembled on the top of the IC board.

Please also refer to FIG. 3, the hard disk 2 can be mounted and dismounted on the inner frame 20 of the present invention by screwing a bolt through the tool holes 12a, 23a of the outer and inner frames. Furthermore, please also refer to FIG. 4, the present invention after installing a hard disk 2, is arranged on top of a IC 4a with a thermal conductivity silicon 5 layer paved in-between to gain the effect of dispersing heat and fixing the IC board 4. The hard disk 2 is then connected to IC board 4 with a 90-degree folding cable 2a, which decreases the polling stress from direct violent shock.

Figure 5A:
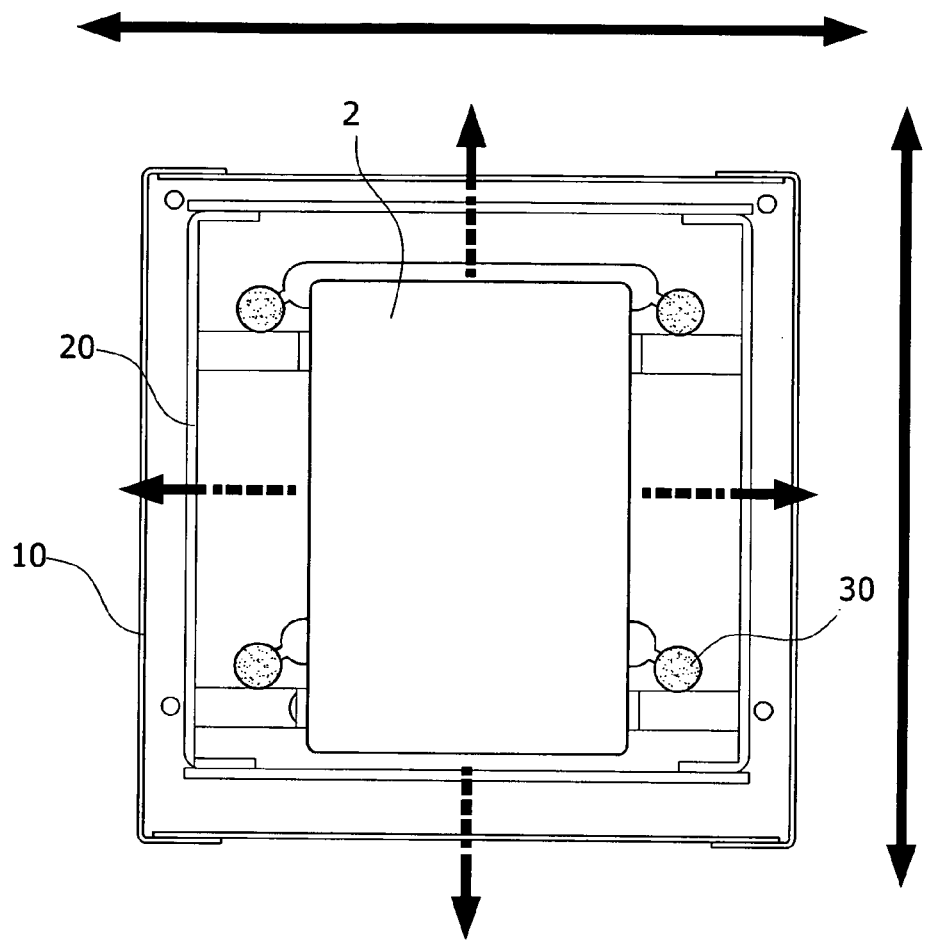
FIG. 5A is the plan view of pseudo vertical shocks of the present invention.
Figure 5B:
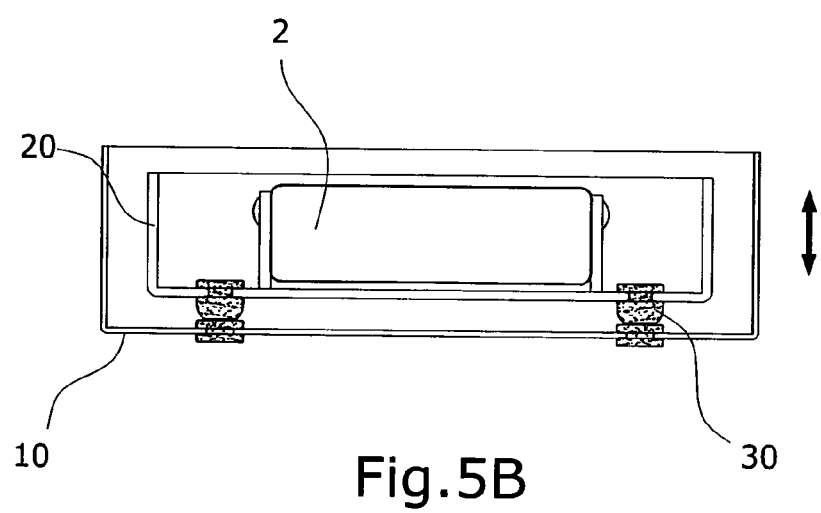
FIG. 5B is the plan view of pseudo horizontal shocks of the present invention.

Please also refer to FIGS. 5A, and 5B, which show the possibility of shocks from various directions; absorber 30 possess a somewhat elasticity to ease both the horizontal and vertical shocks, it is also protected by the outer frame 10 from broking or loosing off by the cause of the forces from horizontal shocks.

In summary, the present invention is related to a shock-resistance device primarily comprises an outer frame, an inner frame, and multiple absorbers to disperse shocks from any directions without loosening the absorbers and with convenient procedures of mounting and dismounting the hard disk.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A device of "hard disk shock-resistance" primarily comprises an outer frame, an inner frame, and multiple absorbers, and characterized by:

the outer frame has multiple assembly holes paired up in a slope way for fixing absorbers around each corner of the frame bottom, and multiple tool holes on sidewalls for tools to pass through;

the inner frame also has multiple assembly holes paired up in a slope way around each corner of the bottom in opposite to each assembly hole of the outer frame, and multiple tool holes on sidewalls for tools to pass through;

the absorber has two nail heads at both end and a belly between the two nail heads which is mounted against to the assembly holes of the outer and inner frames to form a buffer area; that is, to take the advantages of the space between sidewalls of the outer and inner frames, with the absorber cushion in-between two frames to form a buffer area for shock-absorbing.

2. The device of "hard disk shock-resistance" of claim 1, wherein the assembly holes of the outer frame are paired up in a slope way.

3. The device of "hard disk shock-resistance" of claim 1, wherein the assembly holes of the inner frame are paired up in a slope way.

4. The device of "hard disk shock-resistance" of claim 1, wherein the inner frame can decrease high and low frequency resonance, especially decrease the high frequency resonance, by means of building the frame in an adequate thickness and better quality.

5. The device of "hard disk shock-resistance" of claim 1, wherein, after installing a hard disk, a lay of thermal conductivity silicon is glued in-between the bottom surface of the outer frame and the top of the IC to gain the effect of dispersing heat and fixing the IC board in position as well.

6. The device of "hard disk shock-resistance" of claim 5, wherein the hard disk cable bents 90 degree to connect to the bottom of IC board in order to decrease shock strength.

* * * * *